(12) United States Patent
Fernandez et al.

(10) Patent No.: US 9,079,606 B2
(45) Date of Patent: Jul. 14, 2015

(54) ELECTRICAL POWER ASSISTED STEERING SYSTEM

(75) Inventors: Angel Luis Andres Fernandez, Rochester, MI (US); George Thomas Dibben, Glenville (GB)

(73) Assignee: TRW Limited, West Midlands (GB)

( * ) Notice: Subject to any disclaimer, the term of this patent is extended or adjusted under 35 U.S.C. 154(b) by 781 days.

(21) Appl. No.: 12/676,198

(22) PCT Filed: Sep. 4, 2008

(86) PCT No.: PCT/GB2008/002987
§ 371 (c)(1),
(2), (4) Date: Jun. 28, 2010

(87) PCT Pub. No.: WO2009/030905
PCT Pub. Date: Mar. 12, 2009

(65) Prior Publication Data
US 2010/0268418 A1    Oct. 21, 2010

(30) Foreign Application Priority Data

Sep. 4, 2007  (GB) .................................. 0717090.5

(51) Int. Cl.
*B62D 5/04*    (2006.01)
(52) U.S. Cl.
CPC .................................. *B62D 5/0466* (2013.01)
(58) Field of Classification Search
None
See application file for complete search history.

(56) References Cited

U.S. PATENT DOCUMENTS

| 4,753,308 | A |   | 6/1988  | Noto et al.            |         |
|-----------|---|---|---------|------------------------|---------|
| 5,072,804 | A | * | 12/1991 | Bischof et al. ........... | 180/422 |
| 5,314,030 | A | * | 5/1994  | Peterson et al. .......... | 175/26  |
| 5,919,241 | A | * | 7/1999  | Bolourchi et al. ......... | 701/41  |
| 7,100,735 | B2| * | 9/2006  | Burton et al. ............ | 180/446 |
| 7,711,463 | B2| * | 5/2010  | Oya et al. ............... | 701/41  |
| 2007/0198153 | A1| * | 8/2007 | Oya et al. ............... | 701/41  |

FOREIGN PATENT DOCUMENTS

DE  102005011379 A1  10/2005
EP      0416263 A1   3/1991

(Continued)

OTHER PUBLICATIONS

International Search Report for PCT/GB2008/002987 dated Dec. 9, 2008.

*Primary Examiner* — Redhwan K Mawari
*Assistant Examiner* — Edward Torchinsky
(74) *Attorney, Agent, or Firm* — MacMillan, Sobanski & Todd, LLC (57) ABSTRACT

An electric power assisted steering system comprises a steering mechanism which operatively connects a steering wheel to the road wheels of the vehicle, an electric motor operatively connected to the steering mechanism; a torque signal generator adapted to produce a torque signal indicative of the torque carried by a portion of the steering mechanism, a column velocity signal generator for producing a column velocity signal indicative of the angular velocity of the steering wheel or steering column and a signal processing unit adapted to receive the output signals from the sensing means and to produce therefrom a torque demand signal representative of a torque to be applied to the steering mechanism by the motor. The signal processing means includes a processing means which generates a torque damping component which is representative of the sum of a first column velocity term which is a linear function of column velocity and a second column velocity term which is a function of the square of column velocity, or a higher order factor and in which the torque demand signal is dependent upon the value of the torque damping component.

20 Claims, 8 Drawing Sheets

(56) References Cited

FOREIGN PATENT DOCUMENTS

| EP | 1170196 | A2 | 1/2002 |
| EP | 1170196 | A2 | 9/2002 |
| EP | 1764284 | A2 | 2/2007 |
| EP | 1764284 | A2 | 3/2007 |
| JP | 2002166844 | A | 6/2002 |
| WO | 03086839 | A1 | 10/2003 |

* cited by examiner

ELECTRICAL POWER ASSISTED STEERING SYSTEM

CROSS-REFERENCE TO RELATED APPLICATIONS

This application is a national stage of International Application No. PCT/GB2008/002987 filed Sep. 4, 2008, the disclosures of which are incorporated herein by reference, and which claimed priority to Great Britain Patent Application No. 0717090.5 filed Sep. 4, 2007, the disclosures of which are incorporated herein by reference.

BACKGROUND OF THE INVENTION

This invention relates to electrical power assisted steering systems of the kind in which an electrical motor is adapted to apply an assistance torque to a steering component such as a steering column so as to reduce the driver effort required to control the vehicle.

In a simple electric power assisted steering system a torque sensor is provided which is arranged so that the level of torque in a steering column is measured. From this measurement a controller calculates the value of a torque demand signal that is indicative of the torque that is to be generated by an electric motor attached to the steering column. The motor applies a torque to the column of the same sense as that demanded by the driver and thus reduces the effort needed to turn the wheel.

A problem with this simple arrangement occurs in certain driving manoeuvres that excite a vehicle yaw mode transient response—leading to so-called "fish-tailing" of the vehicle. These manoeuvres are typically the result of "unsupported" driver actions on the handwheel such as rotational "flicks" where the driver applies a rapid handwheel angle change but does not follow it through with any substantial applied torque or perhaps releases the handwheel after initiating a rapid turn.

In such circumstances it is desirable that the handwheel returns to the central "straight-ahead" position quickly and with a minimum amount of overshoot or oscillation. In general, however, geometric and inertial effects of the steering system contribute to a free mode yaw response that is lightly damped and quite oscillatory—particularly at high vehicle speeds.

It is known in the art to overcome this problem by including a torque damping component within the torque demand signal that is used to drive the motor. This torque damping component in some sense mimics the mechanical phenomenon of viscous friction that is present in a traditional hydraulic system.

The damping component generally increases in magnitude as a function of steering column velocity from zero torque at zero rotational speed to a maximum at some arbitrary maximum speed. This can be achieved by applying a scaling factor (sometimes called a boost curve) to the column velocity. In effect, as the torque damping component increases the torque output by the motor decreases, and hence the amount of assistance. This gives increased damping and hence stability at high vehicle speeds.

It is further known to provide an additional damping component that is also a function of the torque carried by the column. This can be achieved by applying various scaling factors to the column velocity dependent damping terms. The damping component will typically be reduced at low torques compared to the magnitude of the damping component at high torques. Thus, in hands free manoeuvres where no torque is present in the column the damping will be relatively high and yet be lower during hands on manoeuvres in which torque is generally present in the column.

It has been appreciated by the applicant that it is possible to improve on the arrangements of the prior art, especially in providing an improved feel to the steering as perceived by a driver. Although not in any way intended to be limiting, the improved feel can be considered to constitute a feel that more closely mimics the feel of a traditional hydraulic steering system.

BRIEF SUMMARY OF THE INVENTION

A first aspect of the invention provides an electric power assisted steering system comprising a steering mechanism which operatively connects a steering wheel to the road wheels of the vehicle, an electric motor operatively connected to the steering mechanism; a torque signal generator adapted to produce a torque signal indicative of the torque carried by a portion of the steering mechanism, a column velocity signal generator for producing a column velocity signal indicative of the angular velocity of the steering wheel or steering column and a signal processing unit adapted to receive the output signals from the sensing means and to produce therefrom a torque demand signal representative of a torque to be applied to the steering mechanism by the motor, in which the signal processing unit includes: a processing means which generates a torque damping component which is representative of the sum of a first column velocity term which is a linear function of column velocity and a second column velocity term which is a function of the square of column velocity, or a higher order factor and in which the torque demand signal is dependent upon the value of the torque damping component.

The processing means may comprise a first processing sub-unit, a second processing sub-unit and a third processing sub-unit, in which:

the first processing sub-unit generates a first column velocity term which is a function of column velocity; and the second processing sub-unit generates a second column velocity term which is a function of the square of the column velocity, or a higher order factor;

and further in which the third processing sub-unit is arranged to produce a torque damping component which is dependent upon the sum of the first and second column velocity terms.

The steering system therefore includes a torque damping component which is dependent upon both a linear function of column velocity and a quadratic (or higher factor) function of column velocity. The applicants have realised that such a combination gives the steering a good feel at both very low and very high column velocities. The linear component ensures the system is not underdamped at low velocities (as it may be if only a quadratic term were used). The quadratic term ensures the system is not underdamped at high velocities (as it may be if only a linear term were used). It gives a good damping effect during a vehicle flick test. The quadratic term helps to ensure consistent damping feel at higher column velocities.

The first and second terms may vary with vehicle speed. The first column velocity term may comprise a product of the column velocity and a first scaling function. The second column velocity term may comprise a product of the square of the column velocity, or a higher order factor, and a second scaling function. The scaling functions may themselves vary as a function of vehicle speed.

The scaling functions may comprise boost curves, which may be expressed as mathematical functions.

In an alternative, the product values may be predetermined and stored in a look up table. They need not then represent actual products, merely predefined values for each term for any expected combination of column velocity. For example, if a look up table is provided it may contain velocity terms indexed by column velocity (or square or higher factor of velocity) and also indexed by vehicle speed, i.e. a 2×2 matrix.

The signal processing unit may also generate a torque dependent multiplier term that is a function of column torque. The signal processing unit may include means for calculating the product of the multiplier and the torque damping component.

The torque dependent multiplier may comprise a function of the rate of change of torque, generally being higher for low rates of change than at higher ones. This means that more damping is applied at low rates of change (because a higher multiplier is produced) such as steady state cornering, and less if the torque changes rapidly (such as during a slalom manoeuvre).

The signal processing unit may include one or more filters that are used to filter the column torque in producing the torque demand multiplier. The or each filter may be a low pass filter. It may have a cut off which is approximately equal to the resonant frequency of the vehicle as a whole during a sudden flick test type manoeuvre.

The signal processing unit may also optionally include a filter through which the combined linear and quadratic terms are passed (after they have been combined). This may be a low pass filter with a cut off which is approximately equal to the resonant frequency of the steering column. A cut off of between 2 and 3 Hz may be used, typically 2.5 Hz or thereabouts.

The signal processing means may include a third sub-unit which generates a third column velocity term which is a linear function of the column velocity. It may be the product of the column velocity and a scaling function. This third term may be combined with the output of the filter, i.e. with the filtered combined linear/quadratic term. This third term may therefore be a linear function of column velocity.

A limiter may also be provided within the signal processing unit that limits the damping torque component. This limiter may be applied prior to the application of the optional multiplier or after it. The limit may be a function of the speed of the vehicle. It may be a higher limit and higher vehicle speeds than at lower ones.

The column velocity signal generator may comprise a velocity sensor. Alternatively it may comprise a position sensor that generates a position signal that can be integrated over time to give a velocity signal. The signal used by the signal processing unit may be pre-processed by a scaling function that includes a deadband around zero column velocity. This ensures that for low velocities the velocity signal used to create the different terms is held at zero. The effect is that no damping is applied at low velocities around zero—the limit being dependent on the width of the deadband chosen. Therefore, the phrase "column velocity" used hereinbefore should be interpreted broadly to include an absolute measurement of column velocity as well as a pre-processed signal which is a function of absolute column velocity which has been modified by a suitable scaling factor or boost curve.

The torque signal generator may comprise a single sensor which is connected to the steering column or another mechanical component attached to it. It may be a virtual sensor that determines motor position simply by monitoring the currents flowing in the motor.

The apparatus may include an area of electronic memory in which the function defining the scaling factors or boost curves, and/or any look-up tables are stored.

The signal processing unit may be implemented by a processor that executes program instructions stored in an area of memory. The instructions may cause the processor to perform a number of distinct steps or functions, which define the different sub-units of the signal processing unit. However, it may be possible to implement the signal processing unit using discrete electronic components such as digital logic gates, a group of logic gates forming each sub-unit.

A second aspect of the invention provides an electric power assisted steering system comprising a steering mechanism which operatively connects a steering wheel to the road wheels of the vehicle, an electric motor operatively connected to the steering mechanism; a torque sensor adapted to produce a torque signal indicative of the torque carried by a portion of the steering mechanism, a column velocity sensor for producing a column velocity signal indicative of the angular velocity of the steering wheel or steering column and a signal processing unit adapted to receive the output signals from the sensing means and to produce therefrom a torque demand signal representative of a torque to be applied to the steering mechanism by the motor, in which the signal processing means includes:
a processing means which generates a torque damping component which is representative of the sum of a first column velocity term which is a linear function of column velocity and a second column velocity term which is a function of the square of column velocity, or a higher order factor and in which the torque demand signal is dependent upon the value of the torque damping component,
a processing sub-unit that generates a third column velocity term that comprises a product of the column velocity and a third scaling function;
a filter which is arranged to filter the torque damping component to produce a filtered torque damping component; and
a further sub-unit that is arranged to generate a torque demand signal dependent upon the sum of the value of the torque damping component and the third column velocity term.

The processing means may comprise:
a first processing sub-unit that generates a first column velocity term that comprises a product of the column velocity and a first scaling function;
a second processing sub-unit which generates a second column velocity term which comprises a product of the square of the column velocity, or a higher order factor, and a second scaling function; and
a combining sub-unit that is arranged to produce a term dependent upon the sum of the first and second column velocity terms.

The additional third term added to the filtered combined linear/quadratic term further improves damping and helps deal with high frequency but small amplitude unwanted oscillations.

The output of the combiner may equal the sum of the first and second terms. The torque demand signal may equal the sum of the torque damping component and the third term.

A third aspect there is provided a method of producing a torque damping component for use in an electric power assisted steering system, the method comprising the steps of:
generating a first column velocity term which comprises a product of the column velocity and a first scaling function and
generating a second column velocity term that comprises a product of the square of the column velocity, or a higher order factor, and a second scaling function;

and producing a damping torque component that is dependent upon the sum of the first and second column velocity terms.

The method may additionally comprise the step of passing the damping torque component through a low pass filter.

The method may also comprise the step of generating a third column velocity term which comprises the product of the column velocity and a further scaling function, and combining the additional term with the filtered damping torque component.

The third term and filtered component may be combined by adding them together, or by taking one away from the other.

Other advantages of this invention will become apparent to those skilled in the art from the following detailed description of the preferred embodiments, when read in light of the accompanying drawings.

DETAILED DESCRIPTION OF THE INVENTION

Figure 1:
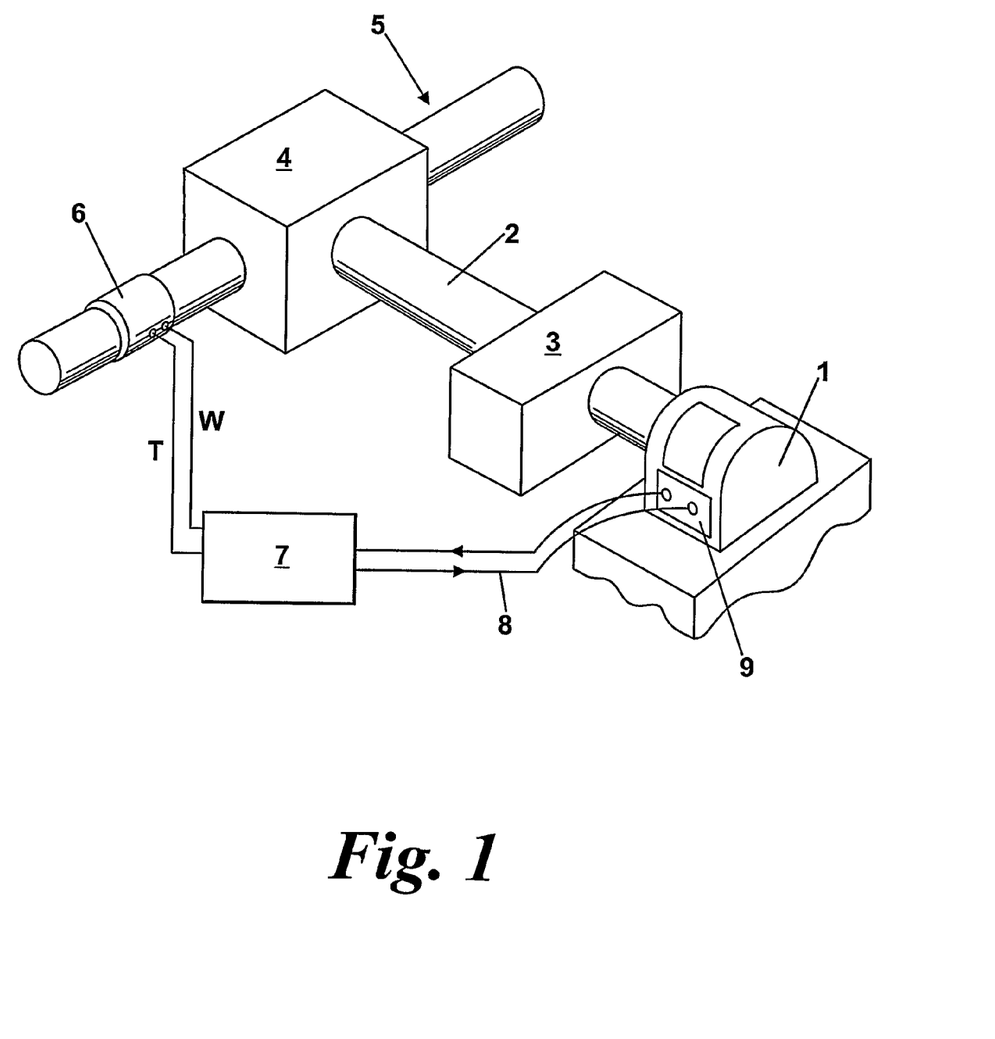
FIG. 1 is a schematic diagram of an electric power assisted steering system in accordance with the present invention.

A typical electric power assisted steering system is illustrated in FIG. 1 of the accompanying drawings. The system comprises an electric motor 1 which acts upon a drive shaft 2 through an (optional) gearbox 3. The drive shaft 2 terminates with a worm gear 4 that co-operates with a wheel provided on a portion of a steering column 5 or a shaft operatively connected to the steering column. Of course, this is not to be taken as limiting to the scope of protection we are seeking, and other power assisted steering systems are envisaged to which the invention has application.

The steering column 5 carries a torque sensor 6 that is adapted to measure the torque carried by the steering column that is produced by the driver of the vehicle as the steering wheel (not shown) and, hence, steering column is turned against the resisting force provided by the vehicles road wheels (also not shown). The output signal T from the torque sensor 6 is fed to a first input of a signal processing unit 7.

An angular velocity sensor is also provided on the steering column shaft. As shown in FIG. 1 this is an integral part of the torque sensor 6. This produces an output signal indicative of the angular velocity w of the shaft. The output from the velocity sensor is fed to a second input of the signal processing unit 7. This may comprise an electronic processor unit or other electronic circuitry.

Furthermore a column position sensor is provided which produces an output signal $N_{col}$ indicative of the angular position of the steering column.

In total three input values are passed to the signal processing unit: column velocity w, vehicle speed V and column torque T.

The signal processing unit 7 acts upon the three input signals to produce, as its output, a torque demand signal 8 that is passed to a motor controller 9. The motor controller 9 converts the torque demand signal 8 into drive currents for the electric motor 1. To produce this demand signal the processing unit includes a number of sub-units, each of which performs a single processing step or a specific set of steps.

The value of the torque demand signal 8 corresponds to the amount of assistance torque to be applied to the steering column by the electric motor 1. The value will vary from a minimum value corresponding to maximum output torque for the motor in one sense, through zero torque when the demand signal is zero, to a maximum motor torque of the opposite sense.

The motor controller 9 receives as its input the torque demand signal and produces currents that are fed to the motor to reproduce the desired torque at the motor drive shaft 2. It is this assistance torque applied to the steering column shaft 5 that reduces the effort needed by the driver to turn the wheel.

The torque demand signal 8 is made up of at least two parts. The first is an assistance torque which depends on the amount of torque a driver is applying to the steering column through the wheel. The second part is a damping torque demand which is provided in order to improve the steering feel and/or enhance the safety of the system. Other torque demand signals can be used in addition, for example to help to counter the effects of cross winds on the vehicle which can cause it to stray from an intended path.

The assistance torque signal is derived as a function of the torque in the steering column as measured by the torque sensor 6. The relationship between the measured torque and the assistance signal is essentially linear. However, other possible relationships may be used to map the torque to the assistance signal. In both cases, as torque increases the magnitude of the assistance signal increases. It will also be understood that the assistance torque signal may be dependent upon other parameters such as vehicle speed if required. In that case it is typical to reduce the value of the assistance torque signal at high speeds to enhance stability and increase it at very low speeds to ease parking manoeuvres.

The damping torque demand signal is essentially a function of column velocity, vehicle speed and column torque. Two terms are generated—a column torque dependent multiplier term and a column velocity dependent damping term, which is multiplied by the multiplier term to give the damping signal. The aim is to give more damping at higher column velocities (to mimic viscous friction in a hydraulic system or any other preferred "feel") but also to reduce the amount of damping under certain conditions such as hands on slalom manoeuvres, or increase it as appropriate in the case of accidental release of the steering wheel during cornering.

Figure 2:
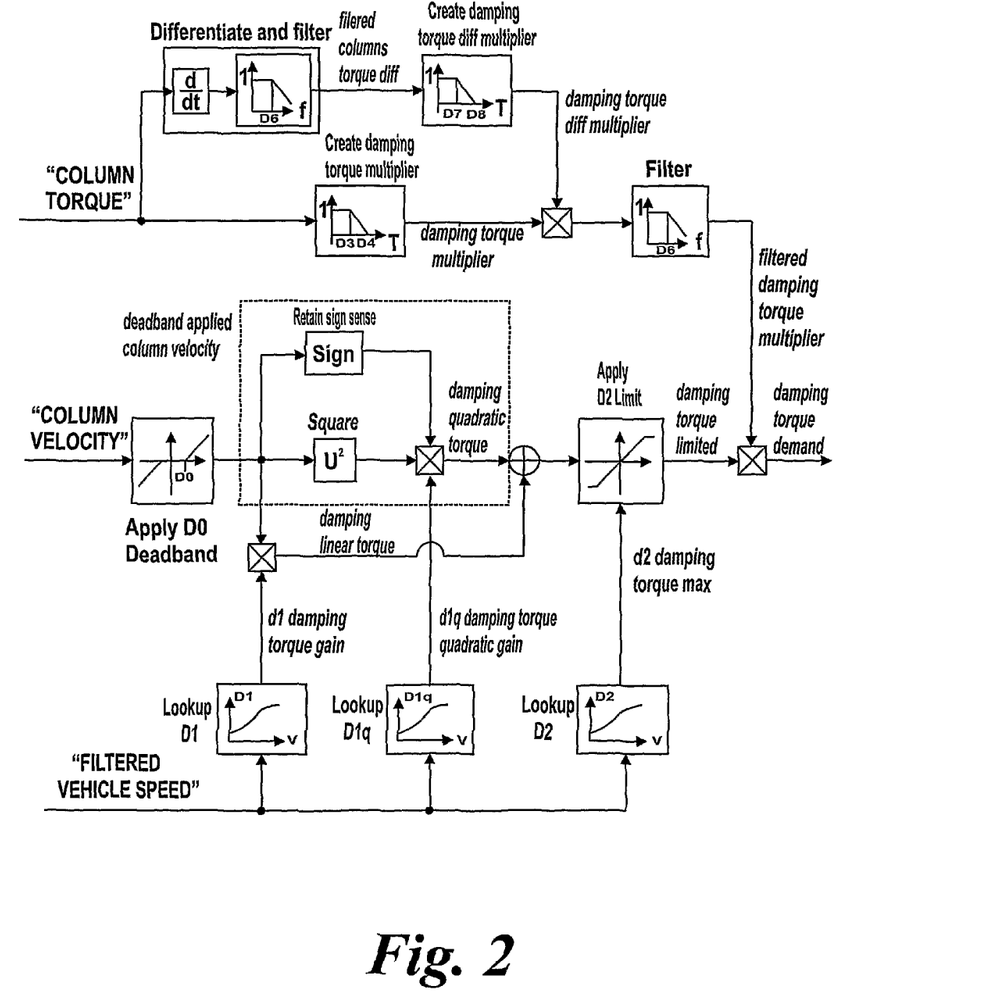
FIG. 2 is a block diagram illustrating the functional steps undertaken by an embodiment of a steering assembly in accordance with the first aspect of the invention to produce the torque damping term within the signal processing unit of the system of FIG. 1.

FIG. 2 illustrates the different sub-units of the signal processing unit and the steps undertaken by the signal processing unit 7, and terms generated within the signal processing, in producing the damping torque demand signal. It can be seen that the torque demand signal 8 is itself produced as two components: an assistance torque multiplier and a column velocity dependent damping torque demand signal. These two components are combined within the signal processor to form the final torque demand signal 8.

To generate the torque dependent multiplier, a scaling function is first applied to the measured torque. The effect of this function is to produce a scaling factor that varies between 1 and 0, with the factor being 1 at low torques, and 0 at high torques. The corner point torque D3 of the function at which it starts to drop from 1 towards zero, and the torque D4 at which it has dropped to 0 are stored in a memory of the assembly.

The torque signal is also differentiated and passed through a low pass filter to provide a filtered column torque value. Generally the filtered value will equal the actual differentiated value at low frequencies, but will drop to zero at high frequencies. The filter may be a first order low pass filter with a 3 db cut-off frequency D6 of 3 Hz although some filtering may be present up to around 20 Hz or more.

In a next step, a scaling function is applied to the filtered column torque differentiated value. This is similar to the initial scaling function applied to the torque signal but has different corner torques and cut-off torques D7 and D8 respectively. They could of course be the same as D3 and D4.

The output of the filter and scaling function is then multiplied by the scaling factor previously generated and then passed through a further low pass filter. This may also be a first order low pass filter with a cut off frequency D6 of about 3 Hz as with the previous filter (although it could be a different shape filter). The output of this last filter is the first damping component.

The column velocity dependent component is generated by first applying a linear scaling function with a deadband D0 around zero column velocity to the column velocity measurement. A further scaling function D1 is then applied to the output of the deadband scaling function to give a first column velocity term that is a linear function of column velocity. The scaling function D1 comprises a boost curve where the value of D1 varies from zero to one as a function of the vehicle speed. At higher speeds the scaling factor is higher than at lower speeds. It can be held as a look up table.

In a next step, the column velocity is multiplied by itself and then multiplied by the sign of the velocity—this ensures that the sign is retained during the multiplication process. A further scaling function D1q is then applied to the squared (quadratic) velocity term to give a second column velocity term that is a quadratic function of the column velocity. This further scaling function D1q is also a function of vehicle speed. The linear term and quadratic terms are then added together.

Finally a limiter D2 is applied to the combined linear and quadratic terms. This limiter is also dependent on vehicle speed, and generally comprises a limit D2 that increases with speed. The combined linear and quadratic terms are not modified by this limiter unless they reach or exceed the limit at which time they are limited to the limit D2.

Figure 5:
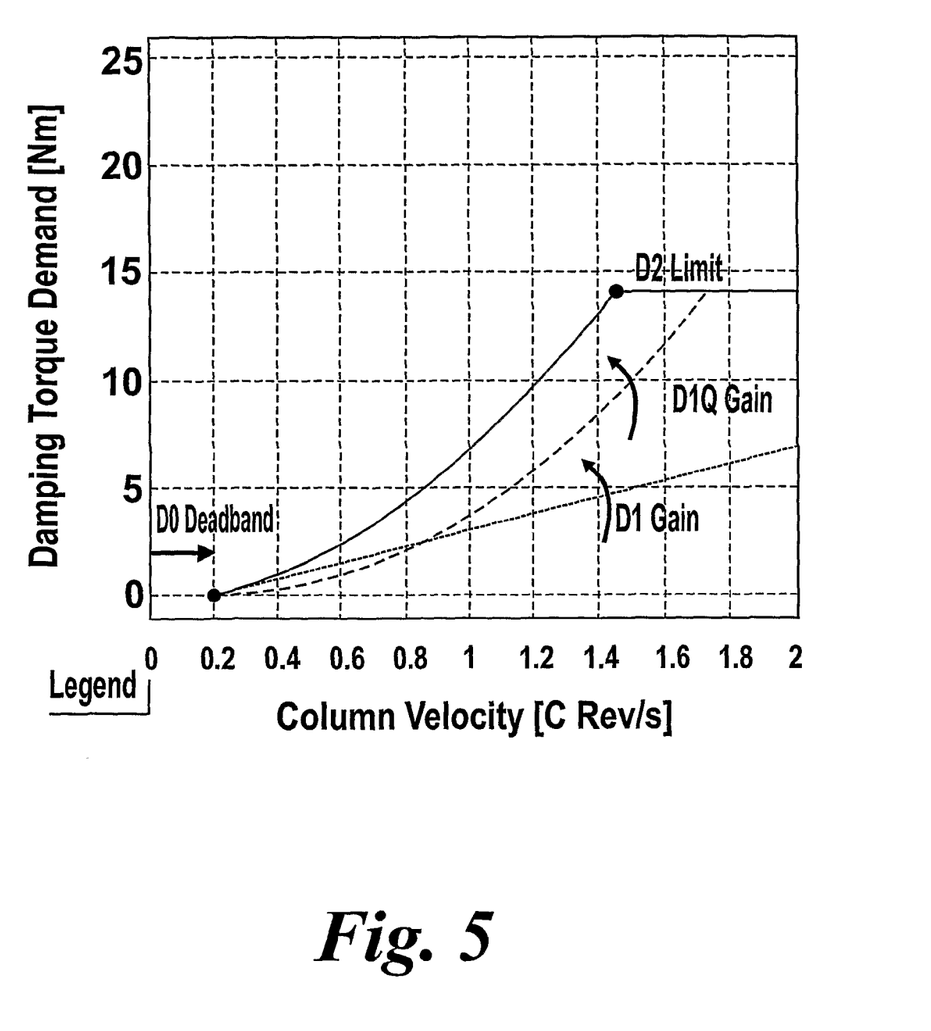
FIG. 5 is a sample trace showing the variation in the value of the damping component produced by combining a linear term with a quadratic term as a function of column velocity against torque demand.

A representative combined linear and quadratic limited torque damping component is shown in FIG. 5 of the accompanying drawings, which plots column velocity against damping torque demand. The plot is overlaid with the linear component and the quadratic component for comparison. A limit has also been applied to the torque demand component. A deadband around zero velocity has also been applied.

The combined, limited, linear and quadratic terms define a column velocity damping torque which is then multiplied by the column torque based multiplier to give the required torque damping component used to control the motor together with the motor assistance torque demand signal.

Figure 3:
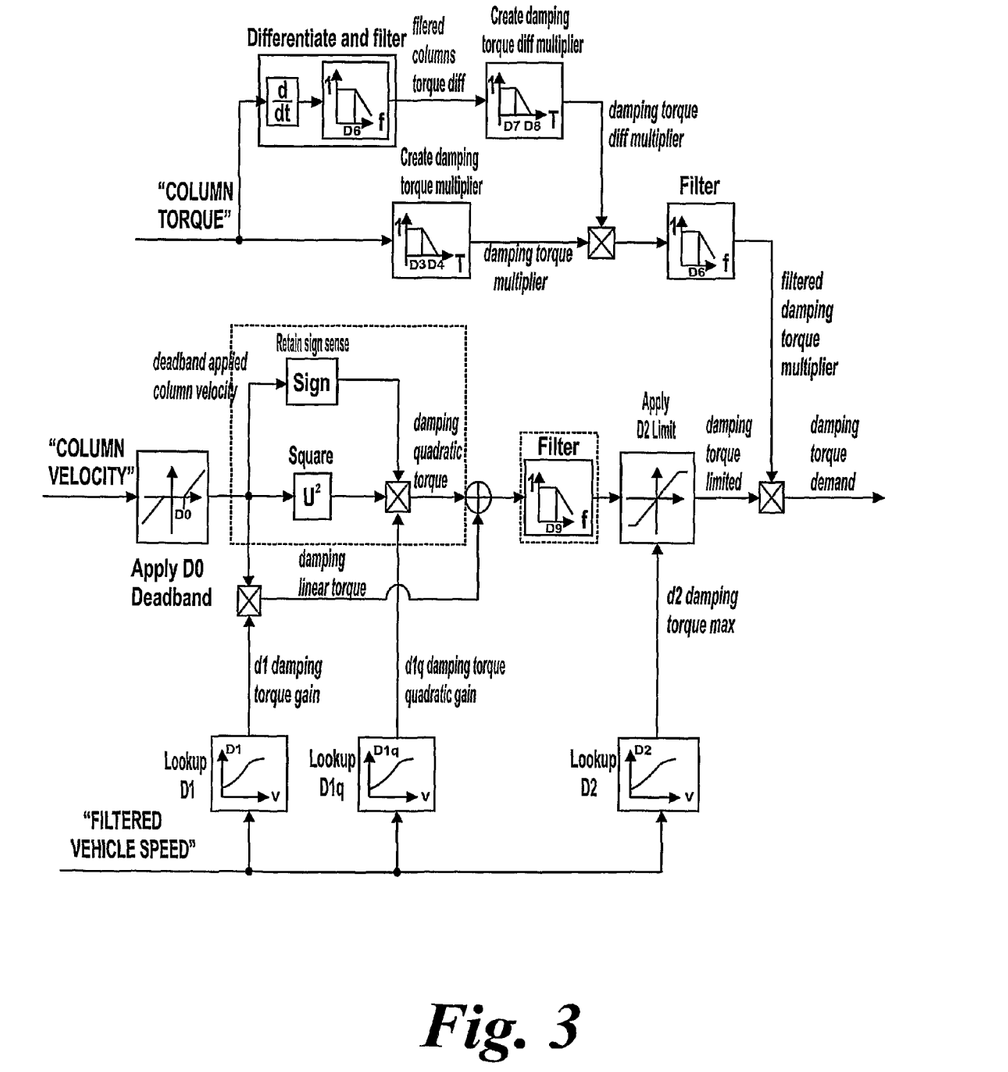
FIG. 3 is a block diagram illustrating the functional steps undertaken by an alternative embodiment of a steering assembly in accordance with the first aspect of the invention to produce the torque damping term within the signal processing unit of the system of FIG. 1.

A modified scheme is shown in FIG. 3 of the accompanying drawings. This is substantially the same as that shown in FIG. 2 except that an additional filter is present. In the example this is a first order low pass filter with a cut-off (3 db point) D9 of about 2.5 Hz to 3 Hz, which is chosen to correspond to the frequency of resonance of the vehicle during damping test manoeuvres. Anything with a frequency below that passes unmodified, but above that is heavily attenuated. This filter is provided before the limiter is applied but after the linear and quadratic terms have been combined.

Figure 4:
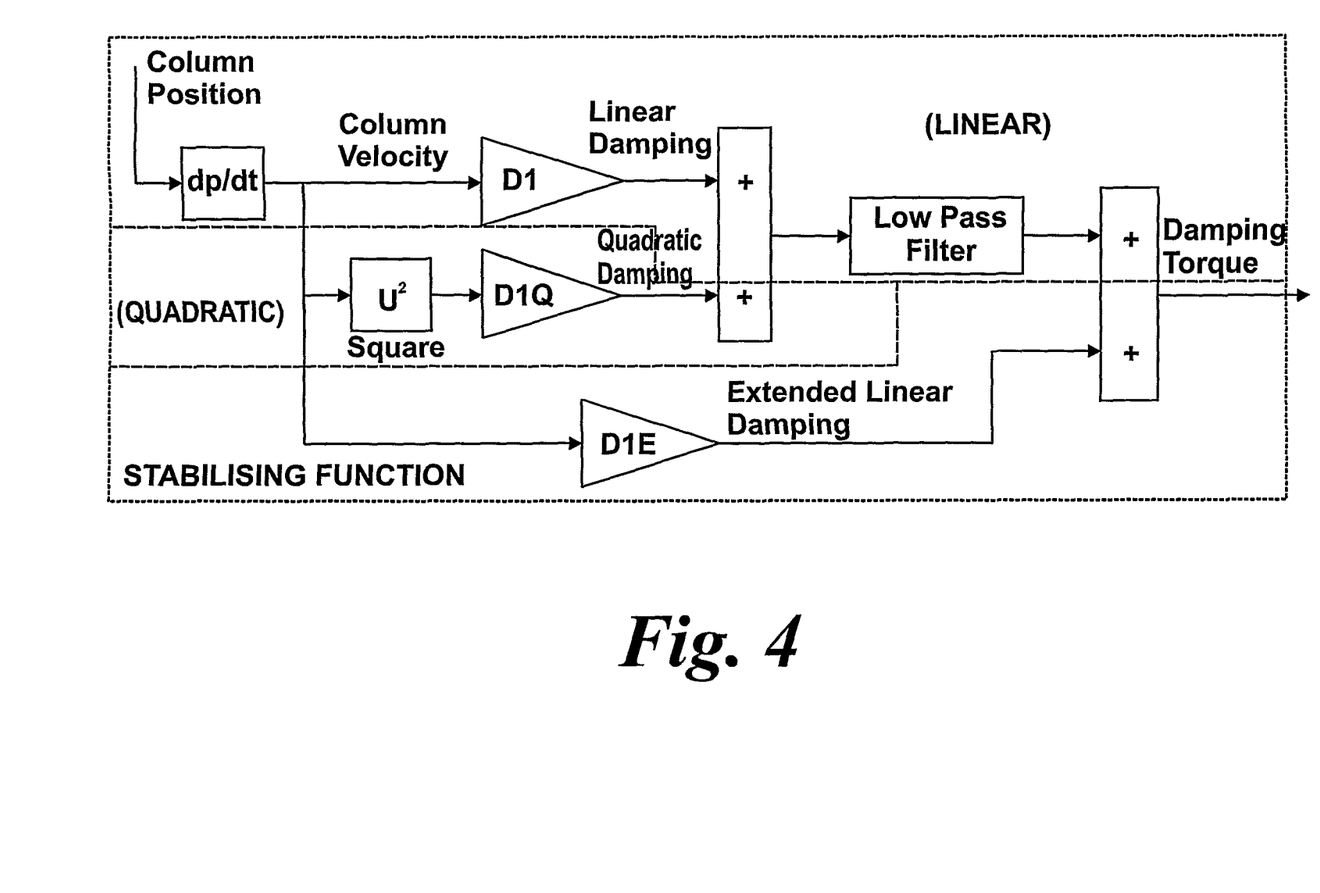
FIG. 4 is a general schematic illustrating an alternative set of steps performed by an alternative embodiment of a steering assembly in accordance with the second aspect of the invention.

A still further modification is shown in FIG. 4 of the accompanying drawings. This figure is somewhat simplified, with the torque damping term having been omitted and the linear and quadratic terms also shown only in general terms. The figure shows a third term that is used to form the second component (that which is dependent on column velocity).

The third term comprises an additional linear function of the column velocity. It is obtained by applying a scaling function to the column velocity signal. In practice this is achieved using a look up table that maps scaled values against column velocity. This is added to the filtered linear/quadratic component to give a different damping torque. It can subsequently, although not shown in FIG. 4, be modified by a torque dependent multiplier as shown in FIGS. 2 and 3. Indeed the embodiments of FIGS. 2 and 3 can easily be modified to include the third term of FIG. 4.

As mentioned, this additional third term is not filtered and so has the same value at all frequencies (unlike the linear/quadratic terms). It has been found that this damping term provides effective damping of the small oscillations of the steering wheel that may otherwise be apparent during a flick test after the initial lock (anywhere from 120 degrees to 10 degrees or so) has been released.

Figure 6A:
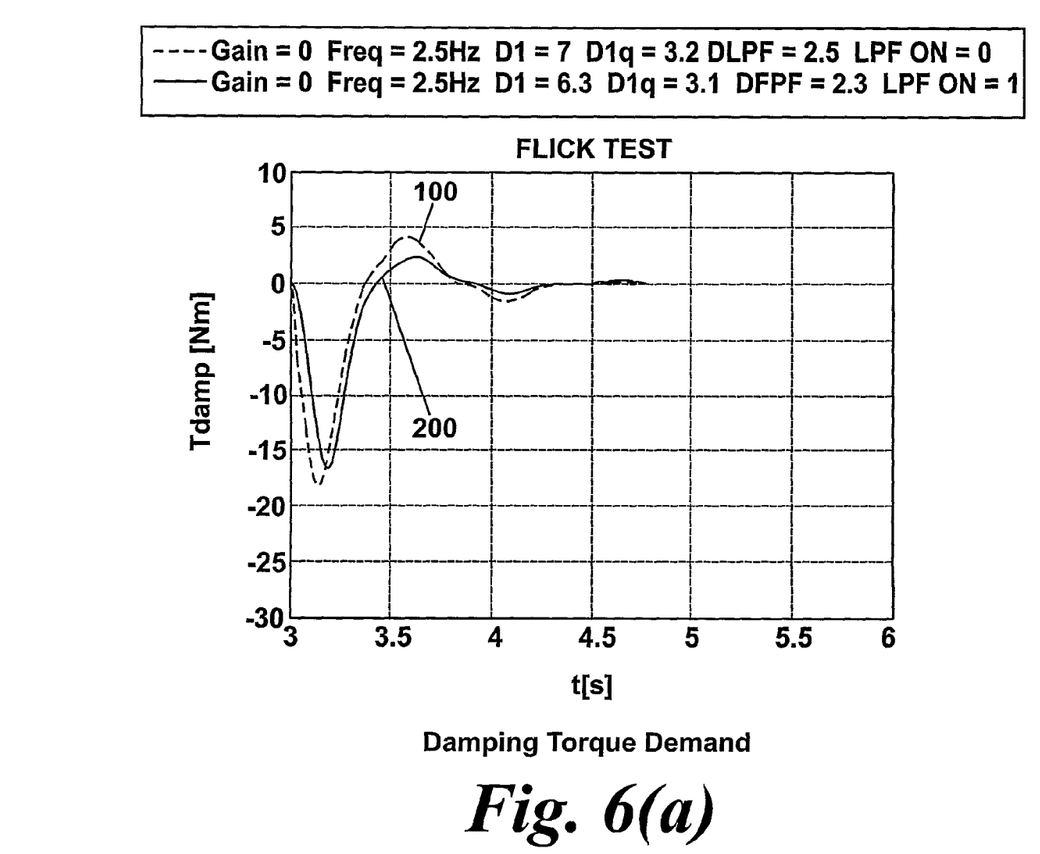
FIGS. 6(a) to (c) show the damping torque demand, vehicle yaw rate and column position of a vehicle fitted with a steering assembly as shown in FIG. 4 during a flick test.
Figure 6B:
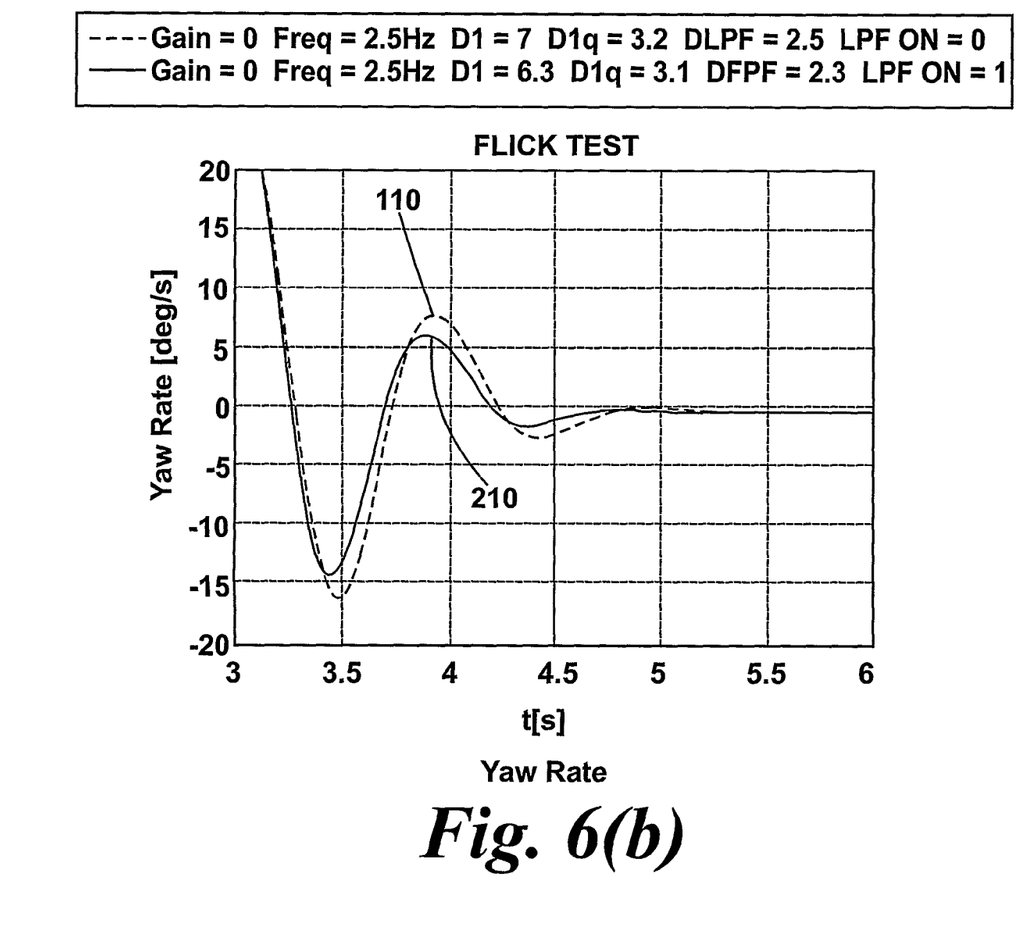
Figure 6C:
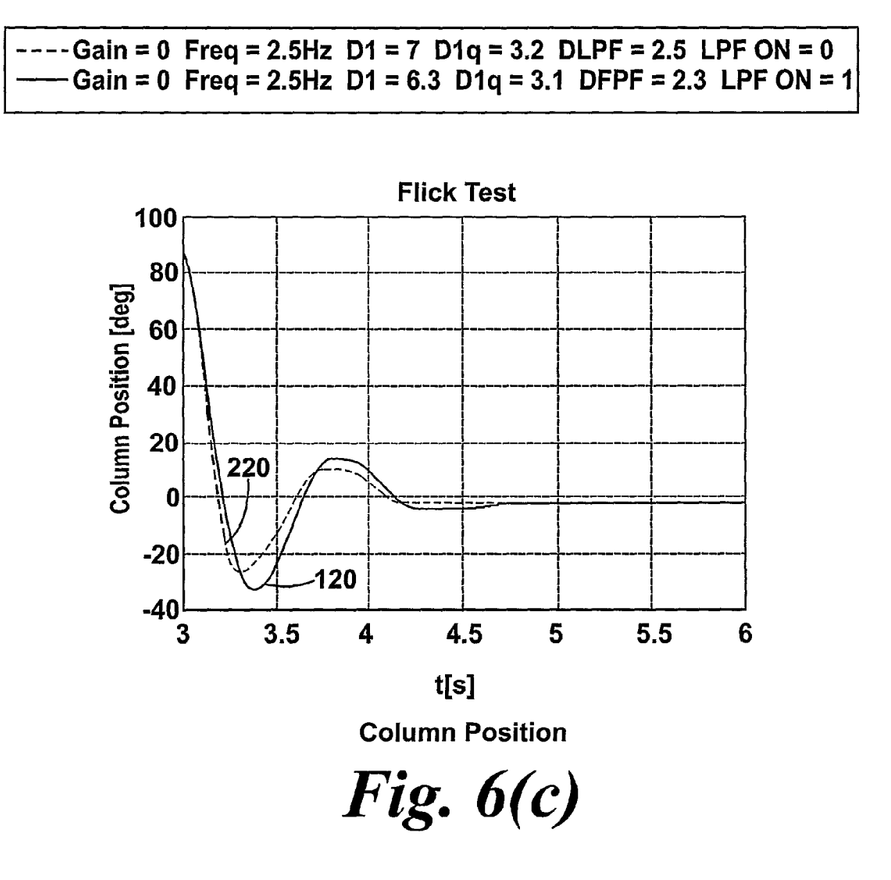

FIGS. 6(*a*), 6(*b*) and 6(*c*) shows the simulated behaviour of a vehicle fitted with a steering apparatus of the kind shown in FIGS. 2 and 3 during a flick test. The plots show Damping torque demand, Yaw rate and column position over time. In this test, the wheel is initially turned abruptly through an angle of 90 degrees and then released. The vehicle should return rapidly to a stable state, and ideally with little or no overshoot as it returns to the straight ahead position. In the examples shown the damping torque demand, vehicle yaw and column position measured over a period of around 6 seconds after the initial flick is applied are shown. It can be seen that the steering is better damped. One trace 100, 110, 120 in each plot shows the behaviour without the additional filter of FIG. 3, the other trace in each plot 200, 210, 220 with it in place. A reduced overshoot is present with the filter, and damping is also seen to be slightly improved.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

The invention claimed is:

1. An electric power assisted steering system comprising:
    a steering mechanism which operatively connects a steering wheel to the road wheels of a vehicle;
    an electric motor operatively connected to said steering mechanism;
    a torque signal generator that is operative to produce a torque signal indicative of the torque carried by a portion of the steering mechanism;
    a column velocity signal generator for producing a column velocity signal indicative of the angular velocity of said steering wheel or a steering column; and a signal processing unit adapted to receive said signals output from said torque signal generator and said column velocity signal generator and to produce therefrom a torque demand signal representative of a torque to be applied to said steering mechanism by said motor;

wherein the signal processing unit is operative to generate a torque damping component which is representative of the sum of a first column velocity term which is a linear function of column velocity and a second column velocity term which is a function of the square of column velocity, and in which said torque demand signal is dependent upon the value of said torque damping component.

2. The system of claim 1 wherein said signal processing unit includes a first processing sub-unit, a second processing sub-unit and a third processing sub-unit, in which: said first processing sub-unit generates a first column velocity term which is a function of column velocity; and said second processing sub-unit generates a second column velocity term which is a function of the square of the column velocity; and further in which said third processing sub-unit is arranged to produce said torque damping component from the sum of the first and second column velocity terms.

3. The system of claim 2 wherein said first column velocity term and second column velocity term vary with vehicle speed.

4. The system of claim 2 wherein said first column velocity term includes a product of said column velocity and a first scaling function and said second column velocity term comprises a product of the square of said column velocity-and a second scaling function.

5. The system of claim 4 wherein said scaling functions vary as a function of vehicle speed.

6. The system of claim 4 wherein said scaling functions include boost curves.

7. The system of claim 1 wherein said signal processing unit also generates a torque dependent multiplier term that is a function of column torque, said signal processing unit further operative to calculate the product of the multiplier term and said torque damping component.

8. The system of claim 7 wherein said torque dependent multiplier comprises a function of the rate of change of torque, generally being higher for low rates of change than at higher rates of change.

9. The system of claim 1 wherein said signal processing unit includes at least one filter that is used to filter the column torque in producing the torque demand multiplier.

10. The system of claim 9 in which the at least one filter is a low pass filter.

11. The system of claim 1 wherein said signal processing unit includes a filter through which the combined linear and quadratic terms are passed.

12. The system of claim 11 wherein said signal processing unit includes a third sub-unit which generates a third column velocity term which is a linear function of the column velocity, and a combining sub-unit that combines the third column velocity term and the filtered combined linear/quadratic term.

13. The system of claim 1 further including a limiter within said signal processing unit that limits the damping torque component as a function of the speed of the vehicle.

14. The system of claim 1 wherein the signal processing unit is operative to generate a torque damping component which is equal to the sum of a first column velocity term which is a linear function of column velocity and a second column velocity term which is a function of the square of column velocity.

15. An electric power assisted steering system comprising:
a steering mechanism which operatively connects a steering wheel to the road wheels of a vehicle;
an electric motor operatively connected to said steering mechanism;
a torque sensor adapted to produce a torque signal indicative of the torque carried by a portion of the steering mechanism;
a column velocity sensor for producing a column velocity signal indicative of the angular velocity of the steering wheel or steering column; and
a signal processing unit adapted to receive said torque signal and said column velocity signal and to produce therefrom a torque demand signal representative of a torque to be applied to the steering mechanism by the motor;
wherein the signal processing unit is operative to generate a torque damping component which is representative of the sum of a first column velocity term which is a linear function of column velocity and a second column velocity term which is a function of the square of column velocity and in which the torque demand signal is dependent upon the value of the torque damping component, said signal processing unit including:
a processing sub-unit that generates a third column velocity term that comprises a product of the column velocity and a third scaling function;
a filter which is arranged to filter the torque damping component to produce a filtered torque damping component; and
a further sub-unit that is arranged to generate a torque demand signal dependent upon the sum of the value of the torque damping component and the third column velocity term.

16. The system of claim 15 wherein said signal processing unit includes:
a first processing sub-unit that generates a first column velocity term that comprises a product of the column velocity and a first scaling function;
a second processing sub-unit which generates a second column velocity term which comprises a product of the square of the column velocity and a second scaling function; and
a combining sub-unit that is arranged to produce a term dependent upon the sum of the first and second column velocity terms.

17. The system of claim 16 in which the output of the combining sub-unit equals the sum of the first and second terms and the torque demand signal equals the sum of the torque damping component and the third column velocity term.

18. A method of operating an electric power assisted steering system, the method comprising the steps of:
providing a steering column that operatively connects a steering wheel to the road wheels of a vehicle and an electric motor that is operatively connected to the steering column;
generating a first steering column velocity term which comprises a product of a steering column velocity and a first scaling function;
generating a second steering column velocity term that comprises a product of the square of the steering column velocity and a second scaling function;
producing a damping torque component that is dependent upon the sum of the first and second steering column velocity terms; and providing the damping torque component to the electric motor of the electric power assisted steering system.

19. The method of claim 18 which additionally includes a step of passing said damping torque component through a low pass filter to produce a filtered damping torque component.

20. The method of claim 19 which also includes a step of generating a third column velocity term which includes a product of said column velocity and a further scaling function, and combining said third column velocity term with said filtered damping torque component.

* * * * *